United States Patent
Manber et al.

(10) Patent No.: US 7,120,668 B2
(45) Date of Patent: *Oct. 10, 2006

(54) SYSTEMS AND METHODS FOR MATCHING PARTICIPANTS TO A CONVERSATION

(75) Inventors: Udi Manber, Palo Alto, CA (US); Chi Chao Chang, Santa Clara, CA (US); Anthony Lamarca, Redwood City, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/686,255

(22) Filed: Oct. 14, 2003

(65) Prior Publication Data

US 2004/0078432 A1 Apr. 22, 2004

Related U.S. Application Data

(63) Continuation of application No. 09/510,201, filed on Feb. 22, 2000, now Pat. No. 6,651,086.

(51) Int. Cl.
*G06F 15/16* (2006.01)

(52) U.S. Cl. .................. 709/205; 715/853; 715/758
(58) Field of Classification Search ........ 709/204–207, 709/228, 219, 224, 203, 313, 318, 217, 231; 715/745, 856, 531, 758, 853; 717/101; 719/330; 370/352; 375/222; 706/11; 710/4
See application file for complete search history.

(56) References Cited

U.S. PATENT DOCUMENTS

| | | | |
|---|---|---|---|
| 5,043,891 A | * | 8/1991 | Goldstein et al. ........... 715/531 |
| 5,586,257 A | | 12/1996 | Perlman |
| 5,627,764 A | | 5/1997 | Schutzman et al. |
| 5,674,003 A | * | 10/1997 | Andersen et al. ........... 709/228 |
| 5,694,150 A | * | 12/1997 | Sigona et al. ............... 715/856 |

(Continued)

OTHER PUBLICATIONS

Conversation Analysis of Internet Chat Rooms www.polisci.wisc.edu/~rdparrish/Chat%20Rooms%20for%20Web%20Site.htm.*

(Continued)

*Primary Examiner*—Thong Vu
(74) *Attorney, Agent, or Firm*—Morrison & Foerster LLP

(57) ABSTRACT

Systems and methods for connecting two or more individuals to an Internet conversation based on their mutual interests, the current content they may be viewing and what they want to talk about at that time. The techniques of the present invention allow an individual who starts a conversation to maintain full control over who is able to join that conversation as well as how many are able to join at any one time. A user who desires to start or join a conversation about a particular topic or story selects an indicator, such as an icon, associated with the specific topic or story. The user is presented with an option to start or join a conversation. If the user opts to start a conversation, the user is presented with a comment page, and the user enters a comment, or comments, that preferably is intended to spark an interest in other users. The comment is then presented to other users. Those users who may desire to join in a conversation with the conversation starter respond with their own comment, which is then sent to the conversation starter. The conversation starter reviews the comment, and if the comment is subjectively acceptable, the conversation starter brings the responding user into a conversation. The responding user and conversation starter are then connected in a messaging session, such as an instant messaging session. Multiple users may be connected in a single messaging session by the conversation starter in this manner.

23 Claims, 3 Drawing Sheets

U.S. PATENT DOCUMENTS

| | | | |
|---|---|---|---|
| 5,715,392 A | 2/1998 | Ansberry et al. | |
| 5,729,687 A | 3/1998 | Rothrock et al. | |
| 5,751,271 A * | 5/1998 | Anstotz et al. | 715/745 |
| 5,754,775 A * | 5/1998 | Adamson et al. | 709/204 |
| 5,781,732 A * | 7/1998 | Adams | 709/205 |
| 5,796,393 A | 8/1998 | MacNaughton et al. | |
| 5,822,523 A | 10/1998 | Rothschild | |
| 5,892,971 A * | 4/1999 | Danielson et al. | 710/7 |
| 5,894,556 A | 4/1999 | Grimm et al. | |
| 5,903,754 A * | 5/1999 | Pearson | 719/310 |
| 5,905,493 A | 5/1999 | Belzer et al. | |
| 5,907,677 A | 5/1999 | Glenn et al. | |
| 5,930,698 A | 7/1999 | Bertacchi | |
| 5,946,699 A | 8/1999 | Sawashima et al. | |
| 5,956,485 A | 9/1999 | Perlman | |
| 5,956,491 A | 9/1999 | Marks | |
| 5,956,509 A * | 9/1999 | Kevner | 719/330 |
| 5,987,503 A | 11/1999 | Murakami | |
| 6,018,766 A | 1/2000 | Samuel et al. | |
| 6,067,552 A * | 5/2000 | Yu | 715/501.1 |
| 6,070,149 A * | 5/2000 | Tavor et al. | 705/26 |
| 6,072,942 A | 6/2000 | Stockwell et al. | |
| 6,088,435 A * | 7/2000 | Barber et al. | 379/205.01 |
| 6,115,605 A * | 9/2000 | Siccardo et al. | 455/426.1 |
| 6,128,660 A | 10/2000 | Grimm et al. | |
| 6,131,087 A | 10/2000 | Luke et al. | |
| 6,134,590 A | 10/2000 | Perlman | |
| 6,161,149 A * | 12/2000 | Achacoso et al. | 710/4 |
| 6,178,453 B1 | 1/2001 | Mattaway et al. | |
| 6,181,736 B1 * | 1/2001 | McLaughlin et al. | 375/222 |
| 6,182,226 B1 * | 1/2001 | Reid et al. | 726/15 |
| 6,198,977 B1 * | 3/2001 | Bixler et al. | 700/83 |
| 6,199,193 B1 * | 3/2001 | Oyagi et al. | 717/101 |
| 6,212,548 B1 | 4/2001 | DiSimone | |
| 6,266,683 B1 | 7/2001 | Yehuda et al. | |
| 6,282,278 B1 | 8/2001 | Doganata et al. | |
| 6,295,549 B1 | 9/2001 | Riddle | |
| 6,345,290 B1 | 2/2002 | Okada et al. | |
| 6,346,952 B1 * | 2/2002 | Shtivelman | 715/758 |
| 6,393,461 B1 * | 5/2002 | Okada et al. | 709/204 |
| 6,400,381 B1 * | 6/2002 | Barrett et al. | 715/758 |
| 6,400,681 B1 * | 6/2002 | Bertin et al. | 370/218 |
| 6,421,678 B1 | 7/2002 | Smiga et al. | |
| 6,424,647 B1 * | 7/2002 | Ng et al. | 370/352 |
| 6,434,599 B1 * | 8/2002 | Porter | 709/204 |
| 6,480,885 B1 * | 11/2002 | Olivier | 709/207 |
| 6,496,851 B1 * | 12/2002 | Morris et al. | 709/204 |
| 6,535,912 B1 * | 3/2003 | Anupam et al. | 709/217 |
| 6,539,421 B1 * | 3/2003 | Appelman et al. | 709/206 |
| 6,567,108 B1 * | 5/2003 | Master et al. | 715/853 |
| 6,587,127 B1 * | 7/2003 | Leeke et al. | 715/765 |
| 6,606,657 B1 * | 8/2003 | Zilberstein et al. | 709/224 |
| 6,611,822 B1 * | 8/2003 | Beams et al. | 706/11 |
| 6,651,086 B1 * | 11/2003 | Manber et al. | 709/205 |
| 6,691,159 B1 * | 2/2004 | Grewal et al. | 709/219 |
| 6,697,383 B1 * | 2/2004 | Li et al. | 370/510 |
| 6,704,874 B1 * | 3/2004 | Porras et al. | 726/22 |
| 6,714,982 B1 * | 3/2004 | McDonough et al. | 709/228 |
| 6,879,994 B1 * | 4/2005 | Matsliach et al. | 709/204 |
| 6,941,345 B1 * | 9/2005 | Kapil et al. | 709/206 |
| 2001/0009014 A1 * | 7/2001 | Savage et al. | 709/204 |
| 2001/0054064 A1 * | 12/2001 | Kannan | 709/203 |
| 2002/0046299 A1 * | 4/2002 | Lefeber et al. | 709/318 |
| 2002/0107994 A1 * | 8/2002 | Rickards et al. | 709/313 |
| 2002/0116476 A1 * | 8/2002 | Eyal et al. | 709/219 |
| 2003/0187925 A1 * | 10/2003 | Inala et al. | 709/204 |
| 2004/0093387 A1 * | 5/2004 | Wick | 709/207 |
| 2004/0111471 A1 * | 6/2004 | Stoner et al. | 709/204 |
| 2004/0210637 A1 * | 10/2004 | Loveland | 709/204 |

OTHER PUBLICATIONS

Chat Administration Documentation;www-swiss.ai.mit.edu/~rfrankel/chatadmin.html.*

Comparing Hybrid Peer-to-Peer Systems—Yang, Garcia-Molina (2001) www.dia.uniroma3.it/~vldbproc/060_561.pdf.*

The Notification Collage: Posting Information to Public and ..—Greenberg, Rounding (2000) www.cpsc.ucalgary.ca/projects/grouplab/people/carl/glPapers/2000/00-CollageNotifier-TechReport667-19/00-notificationcollage-report.pdf.*

Project JXTA Virtual Network—Bernard Traversat Mohamed (20002) www.jxta.org/project/www/docs/JXTAprotocols_01nov02.pdf.*

* cited by examiner

SYSTEMS AND METHODS FOR MATCHING PARTICIPANTS TO A CONVERSATION

BACKGROUND OF THE INVENTION

The present invention relates generally to Internet based conversations between individuals, and more particularly to improved techniques for connecting individuals in conversations based on the individuals' interests.

Internet chat rooms have been in existence for some time. In general there are two types of chat rooms, private and public. In public chat rooms, anyone can join the chat room to discuss issues during any time that the chat room is active. In a public chat room, an individual typically locates the chat room and jumps into the conversation if it is appealing to the individual. The individual is able to simply listen in (i.e. view all comments as they are posted in the room) or the individual may join in by posting a comment. In general, there is no way to prevent an undesirable participant from joining in the conversation, possibly wasting the other participants' time. In private chat rooms, on the other hand, it is possible to prevent undesirable participants from joining a conversation. To join a private chat room, one typically needs a password that is disseminated by one or more of the current participants. In this way, a participant who starts a chat room is able, to some extent, to limit other participants from joining by giving the password to only those individuals they desire to join. Internet chat rooms are also fixed in the sense that they are typically pre-associated with a general topic. Such Internet chat rooms generally do not provide users with the ability to dynamically create a conversation with other users directed to current media content the users may be currently viewing. In particular, there is no ability to control access based on what is being said.

Accordingly, what is needed in the art are methods and systems for dynamically matching and connecting two or more conversants to a conversation without the drawbacks associated with prior art systems such as chat rooms.

SUMMARY OF THE INVENTION

The present invention provides systems and methods for dynamically connecting two or more individuals to an Internet conversation based on their mutual interests, based on the media content they may be viewing and based on what the individuals desire to converse about at the time they may be viewing specific media content. The techniques of the present invention allow an individual who starts a conversation to maintain full control over who is able to join that conversation as well as how many are able to join at any one time. In one aspect, the present invention provides a publicly accessible communications server that allows users to dynamically create and join conversations based on their current mutual interests related to media content the users may be viewing.

According to the invention, a user who desires to start or join a conversation about a particular story or topic associated with a media object selects an indicator associated with the specific topic or story. The indicator may be an icon or a text link, e.g. a "lets talk" text link. Upon selection of the indicator, the user is presented with an option to start or join a conversation. If the user desires to start a conversation, the user is presented with a comment page. The user then enters a comment, or comments, that preferably is intended to spark an interest in other users. The comment is then presented to other users, for example, users who select the option to join a conversation. Those users who may desire to join in a conversation with the "starting" user, or "conversation starter" will respond with their own comment, which is then presented to the conversation starter. The conversation starter reviews the comment, and if the comment is subjectively acceptable, the conversation starter brings the responding user into a conversation by, for example, selecting a "bring into conversation" icon or text link associated with the responding user's reply comment. The responding user and conversation starter are then connected in a messaging session, such as an instant messaging session. Multiple users may be connected in a single messaging session by the conversation starter in this manner.

If the user desires to join a conversation, the user is presented with a list of any comments (from any conversation starters) that are associated with the selected indicator, e.g., the associated topic or story. The user may then respond to any of the presented comments by entering their own reply comment, which is then forwarded to the appropriate conversation starter for review.

According to an aspect of the invention, a method is provided in a messaging server for connecting parties with mutual interests. The method typically comprises the steps of presenting media objects to a first user, accepting a first comment from the first user, and presenting the media object to a second user along with the first comment. The method also typically includes the steps of accepting a reply comment from the second user, and if the reply comment fits a matching criteria, connecting the first and the second user in a messaging session.

According to another aspect of the invention, a method is provided in a messaging server for connecting parties with mutual interests. The method typically comprises the steps of presenting media objects to a plurality of users, accepting a first comment from a first one of the plurality of users, and presenting the media objects to the plurality of users along with the first comment. The method also typically includes the steps of accepting a reply comment from a second one of the plurality of users, presenting the reply comment to the first user, and connecting the first and the second user in a messaging session if the first user indicates approval of the reply comment.

According to yet another aspect of the present invention, a method is provided, in a messaging server, for connecting parties with mutual interests. The method typically comprises the steps of presenting a media object to a plurality of users, accepting a first comment from a first one of the plurality of users, and presenting the media object and a link to the first comment to the plurality of users. The method also typically includes the steps of accepting a reply comment from a second one of the plurality of users in response to the first comment, presenting the reply comment to the first user, and connecting the first and the second user in a messaging session if the first user indicates approval of the reply comment.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
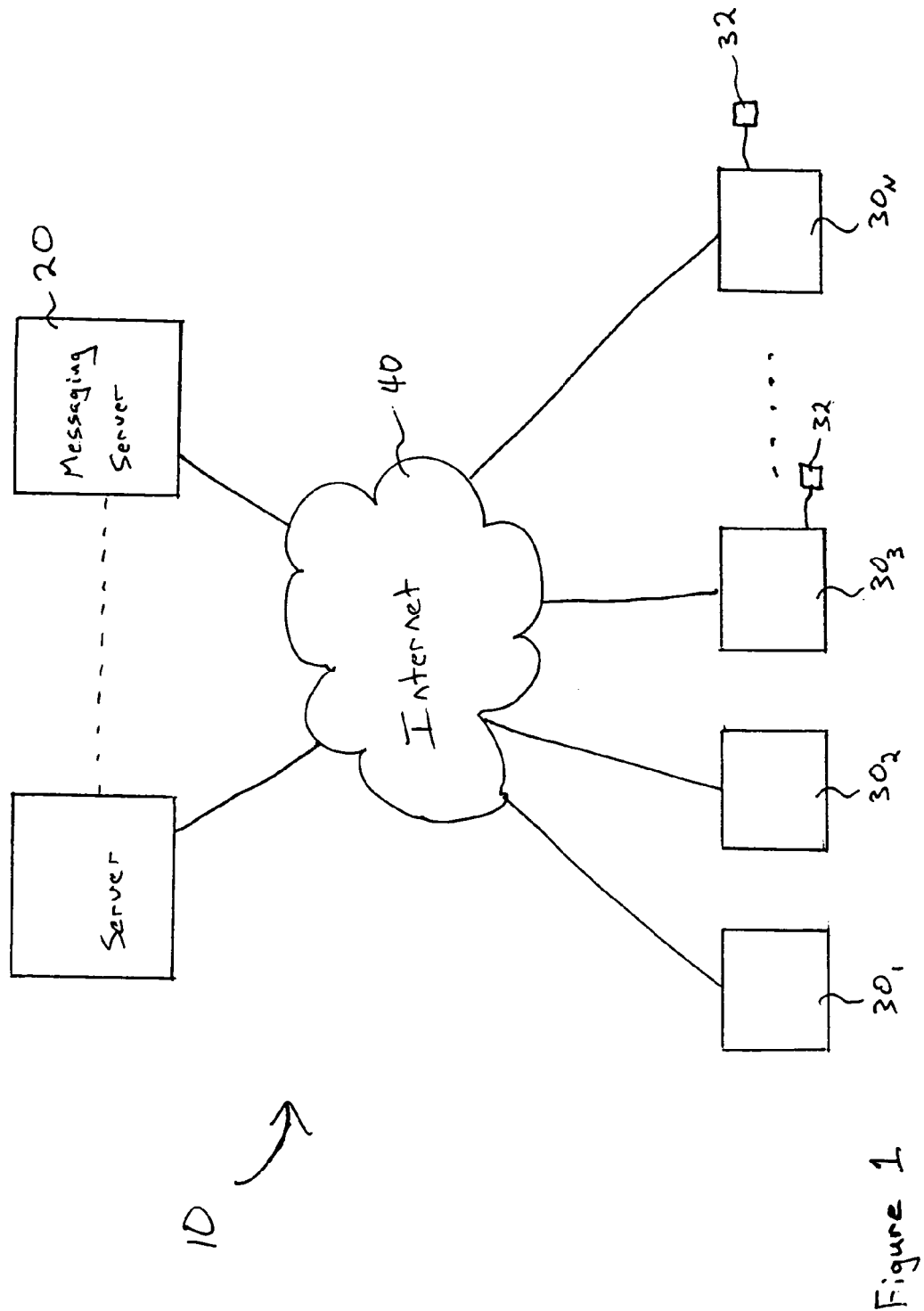
FIG. 1 illustrates a general overview of an information retrieval and communication system including a messaging server according to an embodiment of the present invention.

FIG. 1 illustrates a general overview of an information retrieval and communication network 10 including a messaging server 20 according to an embodiment of the present invention. In computer network 10, clients 30$_1$ to 30$_N$ are coupled through the Internet 40, or other communication network, to messaging server 20. Only one messaging server 20 is shown, but it is understood that more than one messaging server can be used and that other servers providing additional functionality may also be interconnected in network 10 directly, over a LAN or a WAN, or over the Internet.

Several elements in the system shown in FIG. 1 are conventional, well-known elements that need not be explained in detail here. For example, each client 30 could be a desktop personal computer, workstation, cellular telephone, personal digital assistant (PDA), laptop, or any other computing device capable of interfacing directly or indirectly to the Internet. Each client 30 typically runs a browsing program, such as Microsoft's Internet Explorer, Netscape Navigator or the like, allowing a user of client 30 to browse pages available to it from messaging server 20 or other servers over Internet 40. Each client also typically includes one or more user interface devices 32, such as a keyboard, a mouse, touchscreen, pen or the like, for interacting with a graphical user interface (GUI) provided by the browser in conjunction with pages and forms provided by the messaging server 20 or other servers. The present invention is suitable for use with the Internet, which refers to a specific global Internetwork of networks. However, it should be understood that other networks can be used instead of the Internet, such as an intranet, an extranet, a virtual private network (VPN), a non-TCP/IP based network, or the like.

According to one embodiment, messaging server 20, and all of its components are operator configurable using computer code run using a central processing unit. Computer code for operating and configuring messaging server 20 as described herein is preferably stored on a hard disk, but the entire program code, or portions thereof, may also be stored in any other memory device such as a ROM or RAM, or provided on any media capable of storing program code, such as a compact disk medium, a floppy disk, or the like.

In general, users access and query messaging server 20 and other servers through clients 30 to view and download content such as news stories, advertising content, search query results including links to various websites and so on. Such content can also include other media objects such as video and audio clips, URL links, graphic and text objects such as icons and links, and the like.

For example, a user accessing Yahoo's web site at www.Yahoo.com is able to view various news stories, view advertising content, conduct searches on various topics or keywords, access and search various web pages for related stories and web sites, and download video and audio clips. For Yahoo, web pages are organized in a tree structure. At the top of the tree is the entire Yahoo network. Under this node are various nodes, such as Yahoo Shopping, Yahoo Sports, Yahoo Yellow Page, Yahoo Search, etc. Under each of these nodes there may be a variety of descendant nodes, each of which may also have a variety of descendant nodes. For example, under the Yahoo Sports node are the NFL, NHL, NBA, etc nodes, and under the NBA node are Standing, Statistics, Games, etc nodes, and so on.

For any user desiring to talk with other users about a particular subject, topic, news story, video or audio clip, etc. that may be presented to a user at client 30, the user must typically locate or create a chat room. As discussed above, typical fixed chat rooms or message boards may be undesirable for many users. The present invention provides a novel methodology for dynamically connecting two or more users having mutual interests to a conversation as will be discussed with reference to FIG. 2.

Figure 2:
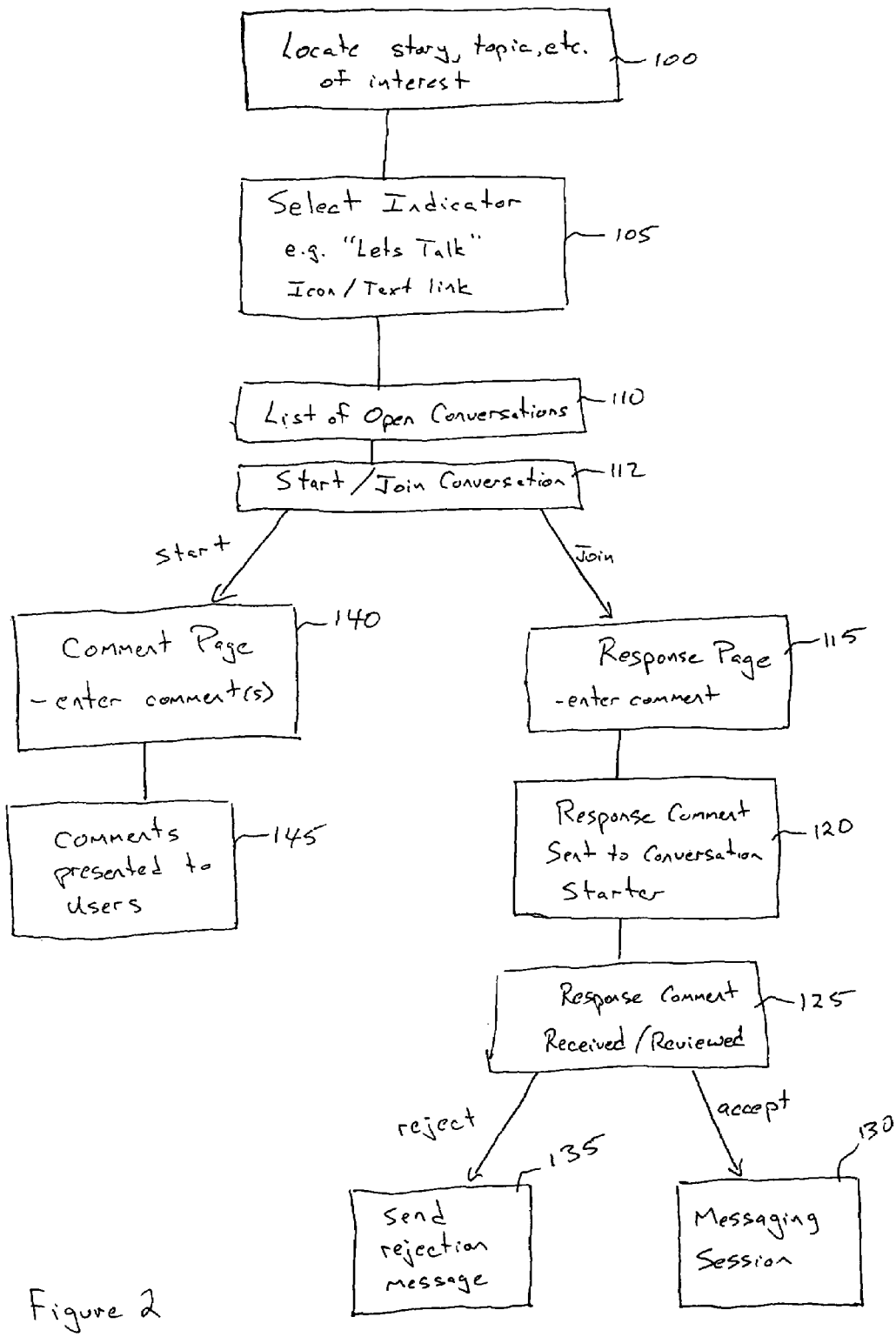
FIG. 2 is a flow chart illustrating the general methodology of starting and joining a conversation according to an embodiment of the present invention.

FIG. 2 is a flow chart illustrating a methodology of starting a conversation or joining an active conversation according to an embodiment of the present invention. Initially, at step 100, a user identifies or locates a story or topic of interest, for example, by browsing various web pages or conducting a topic or keyword search. In one embodiment, as a user browses through various web pages, the user is presented with one or more selectable indicators on each page. Selection of an indicator provides the user with the ability to start or join a conversation as will be discussed below.

Figure 3:
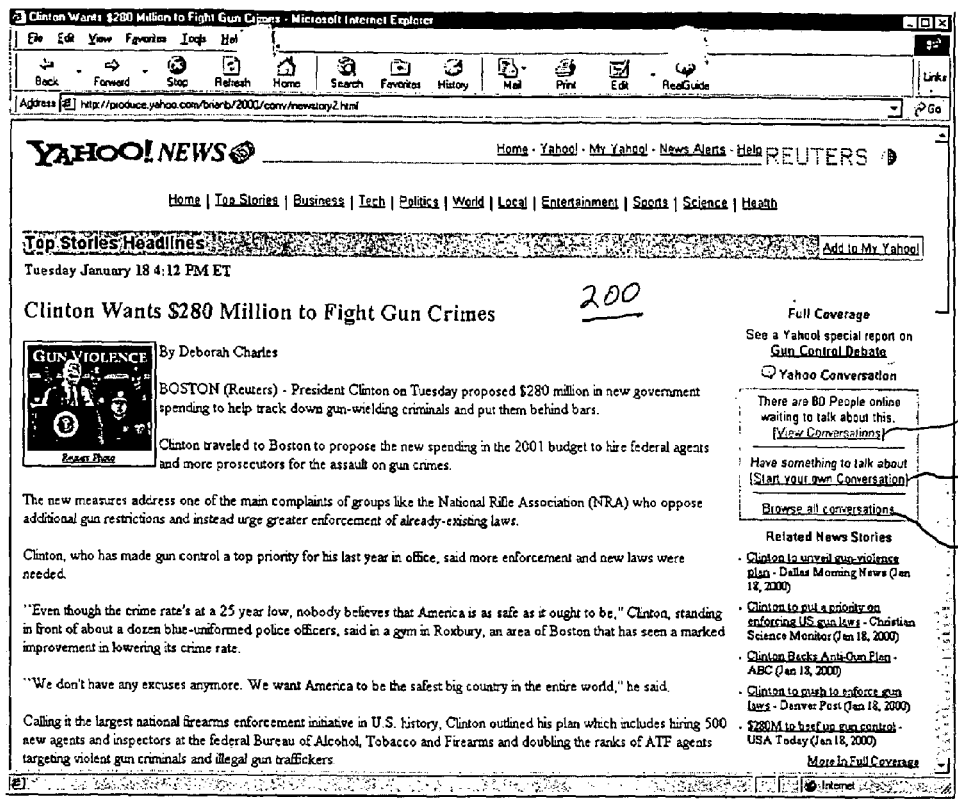
FIG. 3 illustrates an exemplary page that includes a selectable indicator presented in association with a news story according to an embodiment of the present invention.

FIG. 3 illustrates an exemplary page 200 that includes a selectable indicator 210 presented in association with a news story according to an embodiment of the present invention. As shown, the exemplary news story is located under the Yahoo News node. Selectable indicator 210, in one embodiment, is a text link presented in association with the story and preferably includes a phrase indicative of conversation, e.g., as shown, "view conversations", or any other phrase such as "lets talk" or "80 people talking." It will be understood that any other selectable indicator, such as an icon, can be used instead of a text link. Additionally, an indicator can be presented in association with any media object, other than a particular story or topic, that a user may desire to converse with other users about, such as a video or audio clip, a graphic object or a text object presented on the GUI, or any other media object.

Multiple indicators may be concurrently provided on a page. For example, one selectable indicator may be provided in association with a story, and one indicator may be associated with a general topic which may include the subject matter of the particular story. As an example of this as relates to the Yahoo tree structure, a page might include one indicator associated with a particular story about an NBA game (e.g., associated with the Yahoo Sports/NBA/game node) and another indicator associated with the general NBA topic (e.g., associated with the ancestor Yahoo Sports/NBA node).

Figure 4:
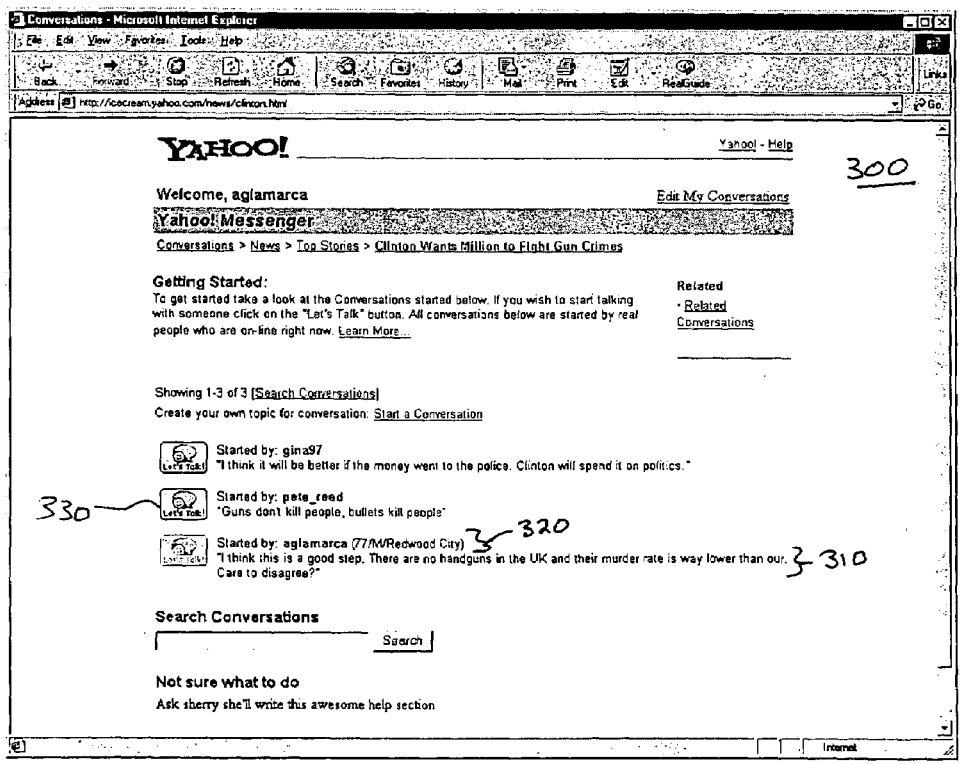
FIG. 4 illustrates a page including a list of conversations according to an embodiment of the present invention.

Referring back to FIG. 2, in step 105, the user selects a desired indicator. Once an indicator is selected, the user is presented with a page at step 110 including a list of conversations about the particular story or topic associated with the indicator that was selected. FIG. 4 illustrates an exemplary page 300 including a list of conversations associated with indicator 210 of FIG. 3. Preferably, the list includes a comment 310 (or comments) presented by the user who started the conversation (the "conversation starter"). Each comment may be presented as text, or it may be presented as a text link. Additional information 320 may be presented in lieu of, or in association with, the comments. Such additional information 320 is preferably determined by the conversation starter, and may include the user ID of the conversation starter, the gender, age, geographic location, political affiliation, or profession, etc. of the conversation starter, or any other pertinent information that may be useful in determining whether to try to join a conversation. In one embodiment, the conversation list includes only "open" conversations. Open conversations include conversations that may still be joined. For example, a conversation starter may have recently closed a conversation or may have indicated when starting a conversation that it be closed when a certain number of other users are joined.

In one embodiment, the user is also initially given the option of starting a conversation. For example, as shown on page 200 of FIG. 3, by selecting a "start your own conversation" indicator 220 (which may be an icon, text link, etc), the user will be able to start and control a conversation. A start conversation indicator 220 may also be presented on page 300 of FIG. 4, or any other page. Thus, if after reviewing the conversations (e.g., comments), the user does not wish to attempt to join any of the open conversations, they may start their own conversation. The user is also optionally given the option of browsing all conversations in one embodiment by selecting the browse conversations link 230.

In an alternate embodiment, upon selection of an indicator at step 105, the user is presented with a page having the options to join or to start a conversation about the particular story or topic associated with the indicator that was selected. In this embodiment, if the user selects the join option, a page including a list of open conversations is then presented; if the user selects the start option, a comment page is presented (see step 140 below).

In one embodiment, when the user selects an indicator associated with a node having descendant nodes, all or a subset of conversations associated with the node and its descendant nodes are displayed. Using the Yahoo tree structure as an example, if a user selects an indicator for the topic NBA (e.g., associated with the Yahoo Sports/NBA node), all or a subset of the conversations for the NBA node and it's descendants will be displayed (e.g., including conversations associated with the Yahoo Sports/NBA/game node).

In step 112, the user selects whether to join a conversation or whether to start a conversation. In one embodiment, a selectable icon 330 is presented in association with each comment, in which case, the user may select to join a conversation by selecting icon 330. Alternately, the comments themselves may be presented as text links or other selection mechanism may be presented in association with each comment. Upon selecting a conversation, e.g., a comment, the user is presented with a response page at step 115. The user enters a reply comment (or comments) that is preferably responsive to the conversation starter's comment and that will be of interest to the conversation starter.

At step 120, the reply comment(s) is sent to the conversation starter. At step 125, the conversation starter receives and reviews the reply comment. The conversation starter is also provided with options to accept or reject the reply comment, e.g. in the form of "accept" and "reject" icons or text links. If the reply comment is subjectively acceptable and the conversation starter selects the accept option, messaging server 20 connects the conversation starter and the responding user in a messaging session at step 130. In a preferred embodiment, the messaging session is an instant messaging session. If additional parties are already present in the conversation, or if additional parties are joined by the conversation starter, the instant messages are broadcast to all participants of the particular conversation. If the reply comment is subjectively unacceptable, or for some other reason the conversation starter selects the reject option, an appropriate "rejection" message is preferably sent to the responding user at step 135. A rejection message may also be sent if the conversation has recently closed. For example, the rejection message may indicate that the conversation is full or closed, or that the conversation starter is unsatisfied with the reply comment.

If at step 112 the user selects to start a conversation, the user is presented with a comment page at step 140. The user then enters a comment, or comments, intended to spark the interest of other users. The comment(s) entered by the conversation starter are then presented to all other users who select the indicator associated with the story or topic with which the comment is associated (step 105).

The comment page may also be configured to receive additional information in addition to the comment(s). For example, in one embodiment, the comment page may be configured to receive information about how many viewers may be presented with the comment(s), how long the comment(s) should be listed, or what type of users may be presented with the comment(s), e.g., based on gender, age range, user ID domains, etc. The conversation starter may also pre-select the number of participants to a conversation, before the conversation is closed.

In one embodiment, during the conversation, the conversation starter is able to deselect a participant from the conversation, for example, by selecting a remove participant icon associated with the particular participant. That participant is then provided with an appropriate message indicating, for example, that the conversation has been closed, or that they are no longer a desired participant. The conversation starter is also preferably provided with the ability to close a conversation when they decide that enough participants have joined, and to reopen the conversation if more participants are desired. In this manner, the conversation starter maintains full control over who participates in the conversation.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, rather than selecting an indicator at step 105, the user may conduct a conversation search for comments having various keywords or phrases, or that were started by users fitting a particular profile (e.g., including gender, age, userID, etc. criteria). Therefore, the scope of the appended claims should be accorded the broadest interpretation so as to encompass all such modifications and similar arrangements.

What is claimed is:

1. A method, in a messaging server, of connecting parties with mutual interests, comprising the steps of:
   providing a media object to be displayed to a first user;
   receiving a first comment from the first user;
   providing the media object to be displayed to a second user along with the first comment;

receiving a reply comment from the second user wherein the first user and the second user are not connected to an instant messaging session; and if the reply comment fits a matching criteria, automatically connecting the first and the second user in an instant messaging system.

2. The method of claim 1, wherein the matching criteria is in the form of an approval indication by the first user of the reply comment.

3. The method of claim 1, wherein the media object includes one, or a combination, of a video clip, a graphic or a text object.

4. The method of claim 1, further comprising the steps of:
providing the media object and the first comment to a third user and subsequent users until a predetermined display count is reached;
providing the first user with reply comments received from the third or subsequent users; and
if any of the reply comments from the third or subsequent users are accepted by the first user, connecting the users having made acceptable reply comments to the instant messaging session.

5. The method of claim 4, wherein the predetermined display count is a function of a parameter settable by the first user.

6. The method of claim 1, wherein a plurality of media objects are associated with nodes in a hierarchical topic network and comments accepted are associated with the nodes.

7. The method of claim 6, further comprising the steps of:
accepting an association from the first user associating the first comment with one of the nodes; and
presenting users' subsets of comments that are associated with a subset of the nodes.

8. The method of claim 7, further comprising a step of limiting the subset of nodes to one parent node and the nodes that are descendants of the one parent node.

9. The method of claim 1, wherein a plurality of media objects are associated with a concept, and wherein comments accepted are associated with one of the concept and a specific one of the plurality of media objects.

10. A method, in a messaging server, of connecting parties with mutual interests, comprising the steps of:
providing a media object for display to a plurality of users;
receiving a first comment from a first user of the plurality users;
providing the media object and the first comment for display to a second user of the plurality of users;
receiving a reply comment from the second user;
providing the reply comment to the first user wherein the first user and the second user are not in an instant messaging session; and
automatically connecting the first and the second user in an instant messaging session if the first user indicates approval of the reply comment.

11. The method of claim 10, wherein the media object includes one, or a combination, of a video clip, an audio clip, a graphic or a text object.

12. The method of claim 10, further comprising the steps of:
providing the media object and the first comment to a third user and subsequent users until a predetermined display count is reached;
providing the first user with reply comments received from the third or subsequent users; and
if any of the reply comments from the third or subsequent users are accepted by the first user, connecting the users having made acceptable reply comments to the instant messaging session.

13. The method of claim 12, wherein the predetermined display count is a function of a parameter settable by the first user.

14. The method of claim 10, wherein a plurality of media objects are associated with nodes in a hierarchical topic network and comments accepted are associated with the nodes.

15. The method of claim 14, further comprising the steps of:
accepting an association from the first user associating the first comment with one of the nodes; and
presenting users' subsets of comments that are associated with a subset of the nodes.

16. The method of claim 15, further comprising a step of limiting the subset of nodes to one parent node and the nodes that are descendants of the one parent node.

17. The method of claim 10, wherein a plurality of media objects are associated with a concept, and wherein comments accepted are associated with one of the concept and a specific one of the plurality of media objects.

18. The method of claim 10, wherein the media object includes a link to the first comment.

19. The method of claim 18, further comprising the step of the second user selecting the link, wherein selection of the link provides a list of one or more comments including the first comment.

20. A method, in a messaging server, of connecting parties with mutual interests, comprising the steps of:
providing a media object for display to a plurality of users;
receiving a first comment from a first one of the plurality of users;
providing the media object and a link to the first comment for display to the plurality of users;
receiving a reply comment from the second one of the plurality of users in response to the first comment;
providing the reply comment to the first user wherein the first user and the second user are not in an instant messaging session; and
automatically connecting the first and the second user in an instant messaging session if the first user indicates approval of the reply comment.

21. The method of claim 20, further comprising the step of the second user selecting the link, wherein selection of the link provides a list of one or more comments including the first comment.

22. The method of claim 20, further including the step of providing the first comment to the second user in response to a search inquiry entered by the second user.

23. The method of claim 22, wherein the search inquiry is a keyword search.

* * * * *